United States Patent [19]

Capps

[11] Patent Number: 5,544,295
[45] Date of Patent: Aug. 6, 1996

[54] METHOD AND APPARATUS FOR INDICATING A CHANGE IN STATUS OF AN OBJECT AND ITS DISPOSITION USING ANIMATION

[75] Inventor: Stephen P. Capps, San Carlos, Calif.

[73] Assignee: Apple Computer, Inc., Cupertino, Calif.

[21] Appl. No.: 890,637

[22] Filed: May 27, 1992

[51] Int. Cl.⁶ .................................................. G06F 15/00
[52] U.S. Cl. ........................... 395/152; 395/146; 395/159
[58] Field of Search ..................................... 395/133, 134, 395/141, 143, 152, 153, 154, 155, 157, 159, 146; 345/122; 273/434, 437

[56] References Cited

U.S. PATENT DOCUMENTS

| | | | |
|---|---|---|---|
| 4,672,541 | 6/1987 | Bromley et al. | 364/410 |
| 4,816,994 | 3/1989 | Freiling et al. | 395/75 |
| 4,821,220 | 4/1989 | Duisberg | 364/578 |
| 4,841,291 | 6/1989 | Swix et al. | 345/122 |
| 4,860,217 | 8/1989 | Sasaki et al. | 395/125 |
| 4,933,889 | 6/1990 | Meshkat et al. | 395/123 |
| 4,951,038 | 8/1990 | Yamamura | 345/122 |
| 4,972,496 | 11/1990 | Sklarew | 382/13 |
| 5,021,976 | 6/1991 | Wexelblat et al. | 395/159 |
| 5,080,377 | 1/1992 | Stamper et al. | 273/437 |
| 5,169,342 | 12/1992 | Steele et al. | 395/159 |
| 5,347,628 | 9/1994 | Brewer et al. | 395/159 |

OTHER PUBLICATIONS

Smith et al., "Designing the Star User Interface", Byte, v. 7, No. 4, pp. 242–282.
St-Denis, R., "Specification by example using graphical animation and a production system", Proceedings of the Twenty-Third Annual Hawaii International Conference on System Sciences, vol. 2, pp. 237–246, IEEE Comput. Soc. Press, Los Alamitos, CA, Jan. 1990.
Apple Computer, "Macintosh Reference", Mar. 1990, pp. 213–214, 331–335.
Claris Corp., "MacDraw II", 1988, pp. 205–207, 242–246, 251–253, 293–300.
Apple Computer, Inc., Screen snapshots from ResEdit 2.062 showing copyright and icon editing, 1990.
Hollan et al., "Graphic Interfaces For Simulation", Advances in Man–Machine Systems Research, vol. 3, pp. 129–163, (JAI Press, Inc. 1987).
Baseline Publishing, *I Like Icon* Color Icon Creation and Animation, Macintosh version User's Guide, pp. 1–24.
O'Connor, Rory J., "Apple Banking on Newton's Brain," San Jose Mercury News, Apr. 22, 1992.
Macintosh User's Guide, Apple Computer, Inc., 1991, pp. 34–35., describes deleting files with mouse device to drag a file representation to a "trash can" icon.

*Primary Examiner*—Almis R. Jankus
*Assistant Examiner*—Joseph R. Burwell
*Attorney, Agent, or Firm*—Hickman, Beyer & Weaver

[57] ABSTRACT

A method characterized by the steps of: a) determining an action to be taken on an object on a computer screen which changes the status of the object; b) modifying the visual appearance of the object through animation to reflect the change in status; and c) automatically moving the modified object on the screen to indicate the disposition of the object. With a delete or "trashing" action, an object is crumpled on screen to indicate that the object has become trash, and the crumpled object is moved across the screen and into a trash can icon to indicate its final disposition. One embodiment of the present invention is a pen based computer system including a central processing unit, a display assembly showing at least one object, and a pointer for inputting information to the computer system. Additionally, the system can receive a change in status command for the object, modify the visual appearance of the object, automatically move the object, and execute the change in status command.

25 Claims, 8 Drawing Sheets

METHOD AND APPARATUS FOR INDICATING A CHANGE IN STATUS OF AN OBJECT AND ITS DISPOSITION USING ANIMATION

BACKGROUND OF THE INVENTION

The present invention relates generally to computer systems and more particularly to graphical user interfaces for computer systems.

Graphical user interfaces (GUI) were popularized by the Lisa® and Macintosh® line of personal computers developed by Apple Computer, Inc. of Cupertino, Calif. A GUI permits users to interact with a computer system in an intuitive manner by selecting, manipulating, and otherwise acting upon graphical images or icons displayed on the screen of the computer. The GUI reduces the apparent complexity of a computer system, allowing the power of the computer to be accessed by even those persons with little or no technical training. A good GUI also enhances the computer experience by providing pleasing and aesthetic feedback to a user.

For example, a file on a Macintosh computer can be represented by an icon on the computer's screen that resembles a file folder. To delete or "trash" the file, it can be selected and dragged to an icon of a trash can, which is always present on the "desk top" of the computer screen. This type of operation is known as a "point-and-drag" operation. The selection is accomplished by using a pointing device (such as a "mouse" or trackball) to position a pointer over the file folder icon, and by pressing a selection button on the pointing device. The selection of the file folder icon is indicated by changing the shade of the icon. The selected file folder icon can then be "dragged" to the trash can icon by continuing to hold down the selection button and manipulating the pointing device until the folder icon coincides with the trash can icon. During the dragging process, the image of the file folder icon remains stationary on the desktop, and a phantom outline image of the icon moves along a path to the trash can icon. When the file folder icon coincides with the trash can icon, the trash can icon changes shade (indicating selection) and a subsequent release of the selection button of the pointing device will "trash" the file folder. Once trashed, the file folder icon will disappear from the screen, and the trash can icon will bulge to indicate that it contains trash.

A new form of computer, the pen-based computer system, presents a new set of challenges and opportunities for an effective and aesthetically pleasing GUI. A pen-based computer system is typically a small, hand-held computer where the primary method for inputting data includes a "pen" or stylus. A pen-based computer system is commonly housed in a flat, rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion.

The stylus of a pen-based computer system is not completely analogous to the pointing devices used with desk top computers. For example, a point-and-drag operation is more cumbersome with a stylus because it doesn't have a select button to initially select the object to be dragged and then to release the object in a desired location. A point-and-drag for a pen-based computer system would involve the multiple steps of selecting an object on the screen, dragging the object, and indicating the completion of the process so that the object can be acted upon accordingly.

Point-and-drag methods of the prior art are helpful and intuitive components of a GUI. However, these methods have several limitations. For one, the user feedback that an object has been selected (by shading the icon) does not give the user any information concerning the change in status of the object, e.g. that it is intended to be deleted. For another, the user must manually drag the object to the desired location. Sometimes, the user misses the desired location and accidentally subjects the object to an unexpected result.

SUMMARY OF THE INVENTION

The method and apparatus of the present invention provides a superior graphical user interface (GUI) when taking an action on an object on a computer screen. The invention is described in terms of the trashing of an object by first crumpling the object and then automatically moving the crumpled object to a trash can icon, but other types of actions and dispositions are also within the scope of the present invention.

Briefly, a method in accordance with the present invention comprises: a) determining an action to be taken on an object on a screen of a computer display, where the action will change the status of the object; b) modifying the visual appearance of the object through animation to reflect the change in status; and c) automatically moving modified object to indicate the disposition of the object.

The apparatus of the present invention preferably includes a pen-based computer system which facilitates the aforementioned method. The object is preferably selected by a stylus or the equivalent, and then a subsequent action is indicated by stylus or keypad command.

When the object is to be deleted, a preferred animated modification of the object's appearance is to "crumple" the object. This is accomplished by dividing the object into tiles, converging the tiles, and drawing a ragged perimeter box around the converging tiles. The animation can be accompanied by sound effects.

The destination of the crumpled object is preferably the trash can icon. The crumpled object can take a direct or fanciful path to the trash can icon to indicate its final disposition.

An advantage of the present invention is that a user is provided with an intuitive and aesthetically pleasing indication of the change in status of the object and its subsequent disposition. Further, the user does not need to manually move the object, which eliminates a potential for point-and-drag errors.

These and other advantages of the present invention will become apparent to those skilled in the art upon a reading of the following specification of the invention and a study of the several figures of the drawing.

BRIEF DESCRIPTION OF THE DRAWINGS

FIG. 9b helps illustrate the process for developing the ragged line of FIG. 9a;

DETAILED DESCRIPTION OF THE PREFERRED EMBODIMENTS

Figure 1:
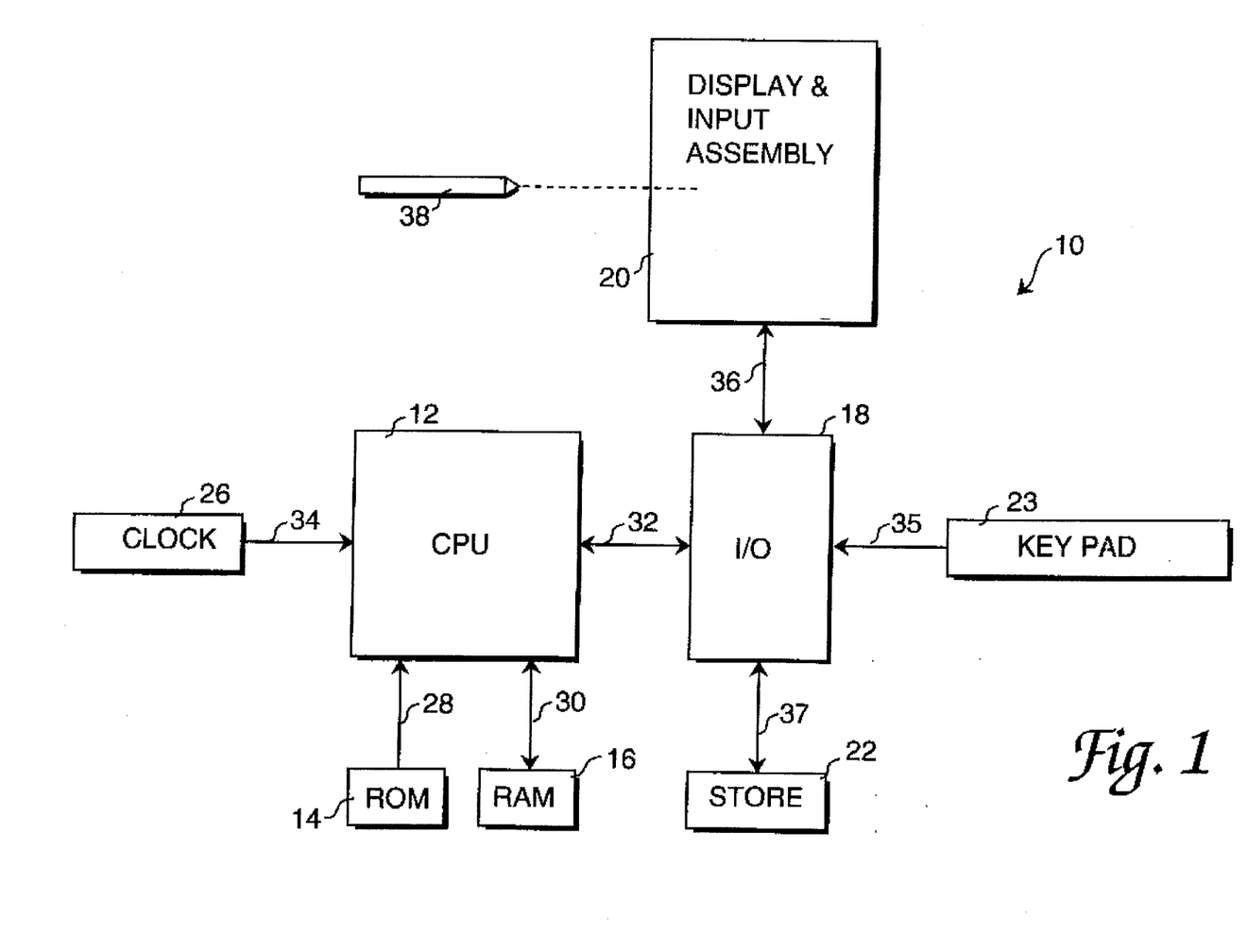
FIG. 1 is a block diagram of a pen-based computer system in accordance with the present invention.

In FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or non-volatile memory such as flash memory, an array of input buttons 23, and a clock 26.

The CPU 12 is preferably a commercially-available, single chip microprocessor. While CPU 12 can be a complex instruction set computer (CISC) chip, it is preferable that CPU 12 be a low power, reduced instruction set computer (RISC) chip. CPU 12 is coupled to ROM 14 by a uni-directional data bus 28. ROM 14 contains the basic operating system for the pen-based computer system 10. CPU 12 is connected to RAM 16 by a bi-directional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices, and to the clock 26 by a uni-directional data line 34. Keypad 23 is coupled to I/O circuitry 18 by a uni-directional data line 35, and mass storage unit 22 is coupled to I/O circuitry by a bi-directional data line 37.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the array of input buttons 23.

Clock 26 provides a series of clock pulses and is typically coupled to an interrupt port of CPU 12 by the data line 34. The clock pulses are used to time various functions and events relating to the computer system 10. The clock 26 can be eliminated and the clock function replaced by a software clock running on CPU 12, but this tends to be a wasteful use of CPU processing power. In the present invention, clock 26 provides clock pulses at 60 hertz (Hz).

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. These position-sensitive membranes are also readily available on the commercial market. Combination display assemblies such as display assembly 20 which include both the LCD and the input membrane are commercially available from such vendors as Scriptel Corporation of Columbus, Ohio.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointing device", "pointing means", and the like will refer to any mechanism or device for pointing to a particular location on a screen of a computer display.

Some type of mass storage 22 is generally considered desirable. However, the mass storage 22 can be eliminated by providing a sufficient amount of ROM 14 and RAM 16 to store user application programs and data. In that case, the RAM 16 could be provided with a back-up battery to prevent the loss of data even when the pen-based computer system 10 is turned off. However, it is generally desirable to have some type of long term storage 22 such as a commercially available miniature hard disk drive, or non-volatile memory such as flash memory or battery-backed RAM.

In operation, information is input into the pen-based computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. X & Y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

The aforementioned process produces the illusion that the stylus 38 has an "ink" which appears on the screen of the display assembly 20. Therefore, as used herein, the terms "inking" and "ink" will refer to the process and the result, respectively, of displaying a line or other indicia on the screen of display assembly 20 in response to the movement of stylus 38 on the screen.

Figure 2:
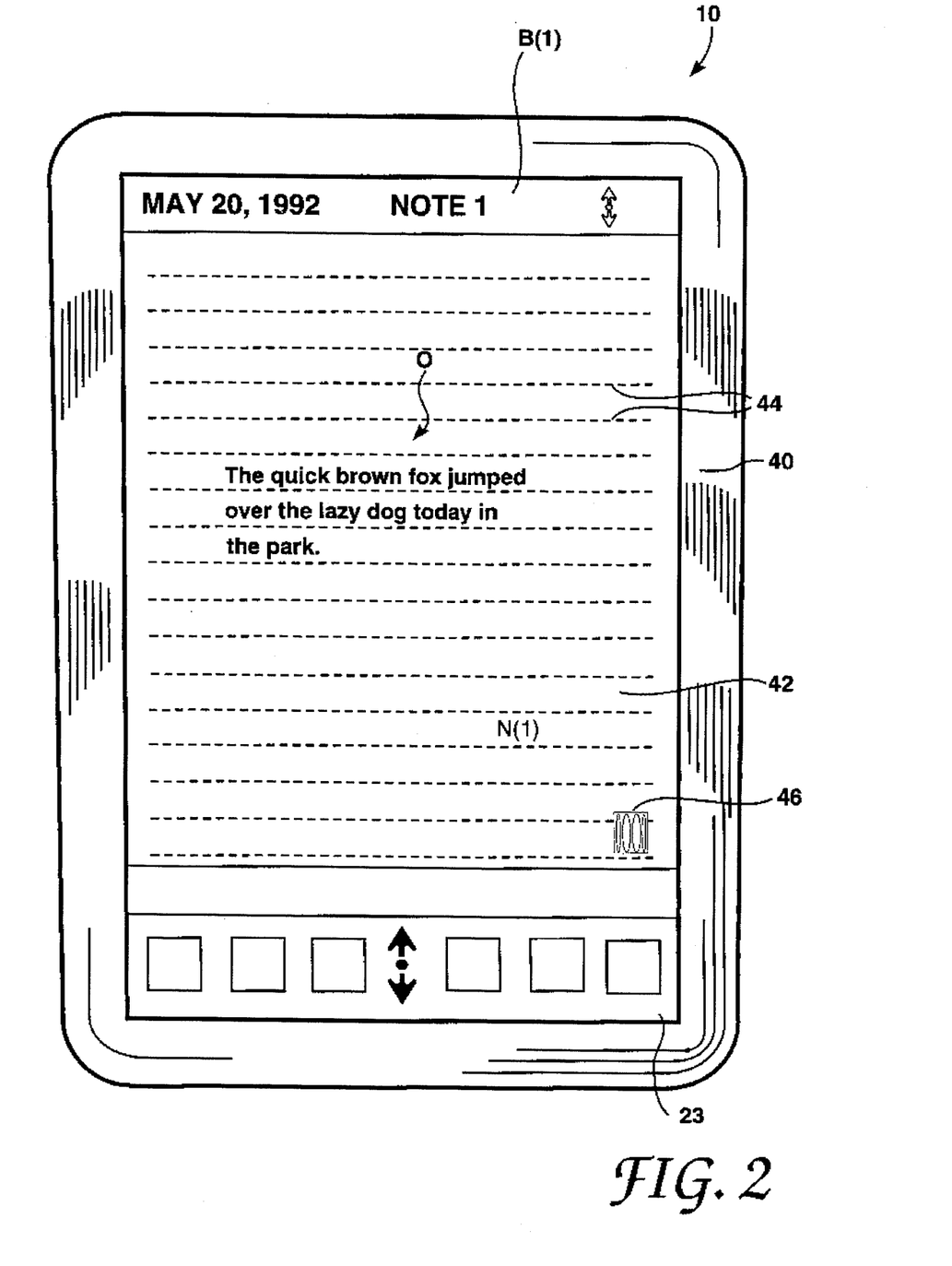
FIG. 2 is a pictorial representation of the screen of a computer display assembly of the present invention where a text object has been entered.

In FIG. 2, the pen-based computer system 10 is shown housed within a generally rectangular enclosure 40. The CPU 12, ROM 14, RAM 16, I/O circuitry 18, mass storage 22, and clock 26 are preferably enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 23.

Upon power-up, pen-based computer system 10 displays an initial note area N(1) on screen 42 including a header bar B(1) and a number of guidelines 44. The optional guidelines 44 aid a user in entering text, graphics, and data into the pen-based computer system 10. For example, a text object O has been entered on the screen 42 by the stylus 38. A trash can icon 46 is shown in the bottom, right-hand corner of screen 42. Alteratively, the trash can icon can be stored within a "drawer" that can be opened and closed by user command.

Figure 3:
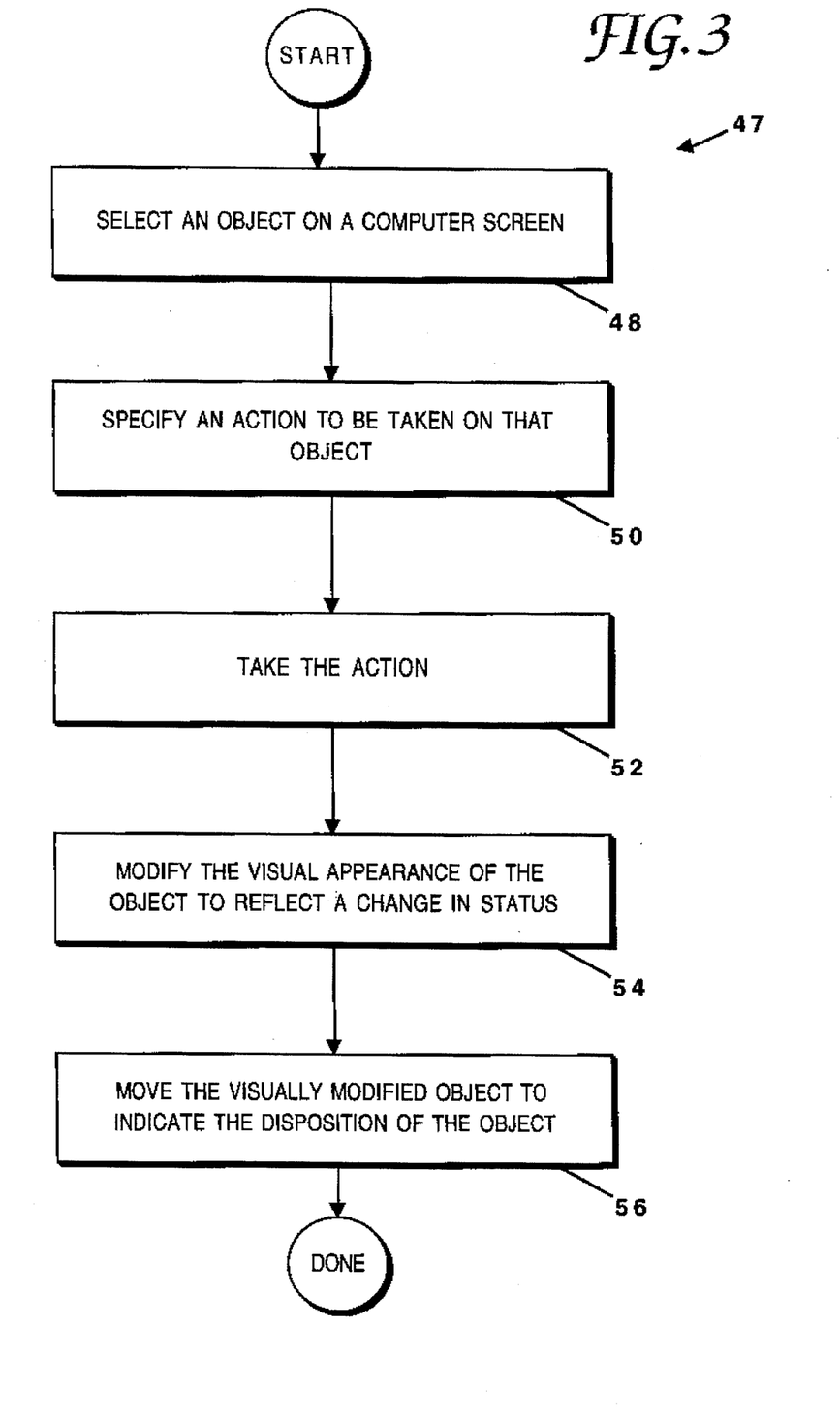
FIG. 3 is a flow diagram of a method in accordance with the present invention for indicating a change in status of an object and its disposition on a computer display.

FIG. 3 illustrates a method 47 for indicating a change in status of an object and its disposition on a computer display in accordance with the present invention. In a first step 48, an object, such as text object O, is selected on a computer screen. It should be noted that the selected object can be part or all of the screen 42. In the case that the object selected is the whole screen, all of the indicia on the screen 42 including the guidelines 44 would be selected. Next, in a step 50, an action to be taken on the object is specified. In step 52, the action is taken, and in step 54 the visual appearance of the object is modified through animation to reflect a change in status of the object. Finally, in step 56, the visually modified object is moved to indicate the disposition of the object. The action step 52 can occur any time in process 47 after the specification step 50.

Figure 4:
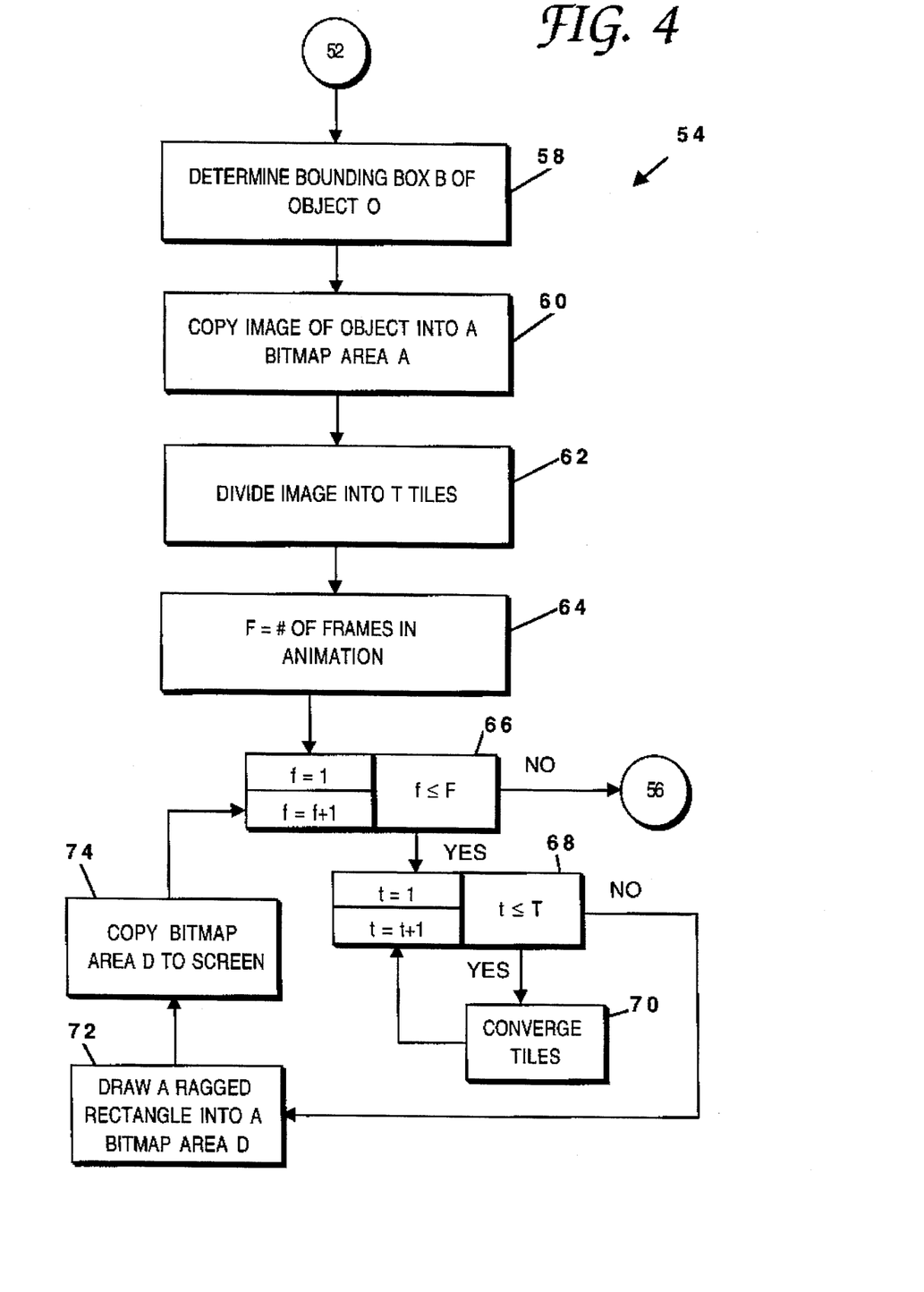
FIG. 4 is a flow diagram of step 54 of FIG. 3.

FIG. 4 illustrates a "Modify Visual Appearance" process 54 of FIG. 3 in greater detail. The process of FIG. 4 "crumples" a text object to indicate that it is being deleted or "trashed." As will be discussed in greater detail subsequently, there are other types of visual modifications to which objects can be subjected as part of step 54.

Figure 5:
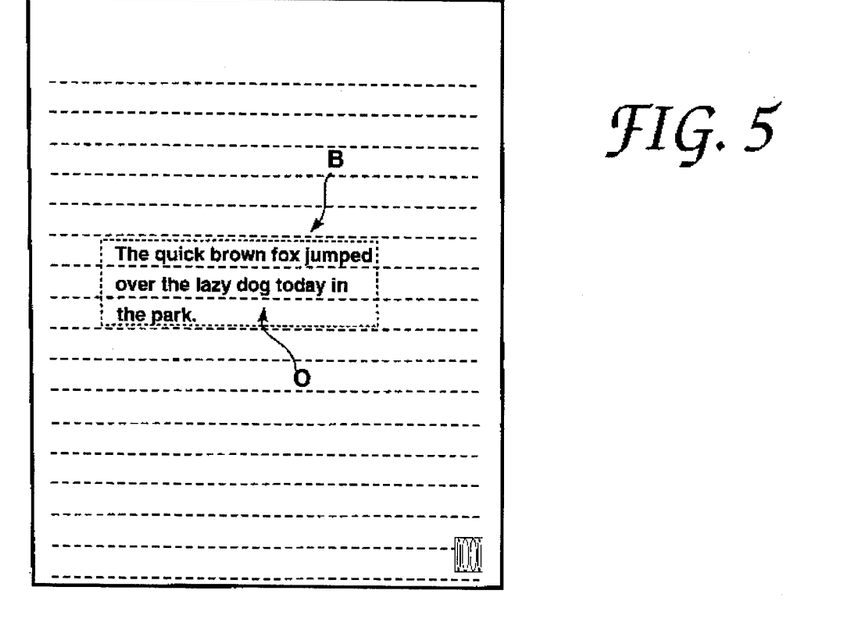
FIG. 5 is a pictorial representation of the screen of FIG. 2 with the text object bounded by a bounding box.

In a first step 58 of FIG. 4, the bounding box B of object O is determined. Referring briefly to FIG. 5, the bounding box B is simply the minimal rectangle which encloses the text object O. The bounding box B can be provided by the system software, as is well known to those skilled in the art. Alternatively, the bounding box B can be calculated by finding the minimum and maximum "x" coordinates and the minimum and maximum "y" coordinates of the text object.

Figure 6A:
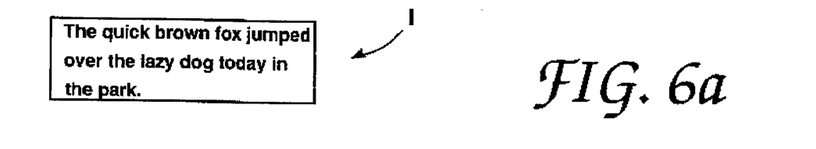
FIG. 6a illustrates a bitmapped image of the text object of FIG. 5.

Next, in a step 60, the image of the object O within bounding box B is copied into a bit map area A. A bit map area is simply an area in memory RAM 16 where storage bits of RAM 16 map one-for-one to pixels on screen 42. Bit mapping techniques are well known to those skilled in the art. A representation of the bit mapped image I is shown in FIG. 6a.

Figure 6B:
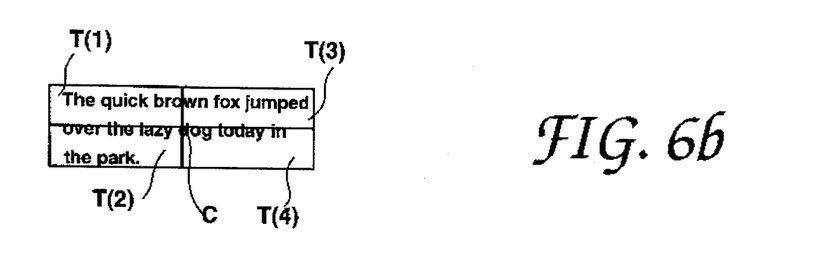
FIG. 6b illustrates the bitmapped image of FIG. 6a after it has been divided into a number of tiles.

In step 62, the bit mapped image is divided into T tiles. If, for example, T=4, the image I is divided into four tiles T(1), T(2), T(3), and T(4) as shown in FIG. 6b. The center of bit map area A, i.e. of the image I, is C. The constant F is then assigned the number of desired animation frames in a step 64. A frame is a still image which, when presented in rapid sequence with other frames, will present an animated image. Animation utilizing a series of frames stored in a computer system is well known to those skilled in the art.

Step 66 is an iterative loop step which iterates a counter f in the range of f={1::F}, where F is the number of frames. Step 68 is an interative loop step which iterates the counter t in the range of t={1::T}, where T is the number of tiles of the bit map image I. Step 70 converges the tiles towards the common center C, as will be discussed in greater detail subsequently. Since T=4, the converge tiles step 70 will be repeated four times by the iterative loop step 68.

After T cycles, iterative loop step 68 turns over process control to a step 72 which draws a ragged rectangle derived from the bit map area A to a bit map area D. Bit map area B, like bit map area A, is simply a location in RAM 16 having bits which map to pixels on screen 42. Finally, in a step 74, the bit map area D is copied to screen 42 to present one frame of an animated image of a crumpling text object O to a user. The iterative loop step 66 repeats F times to provide F animation frames of the crumpling text object.

Figure 7:
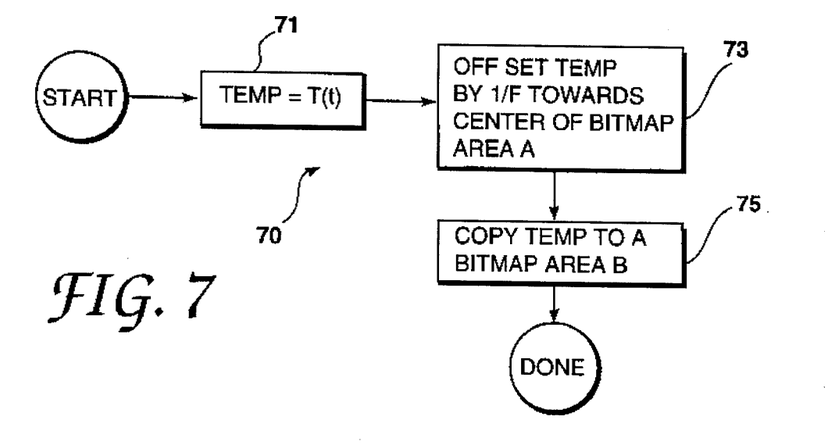
FIG. 7 is a flow diagram of step 70 of FIG. 4.
Figure 7A:
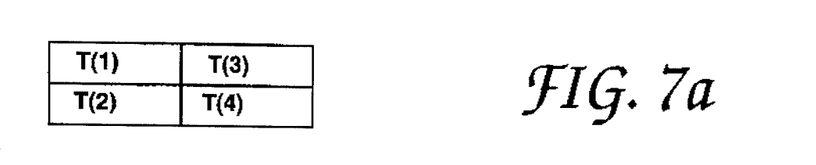
FIGS. 7a and 7b illustrate the converging tile process of FIG. 7.
Figure 7B:
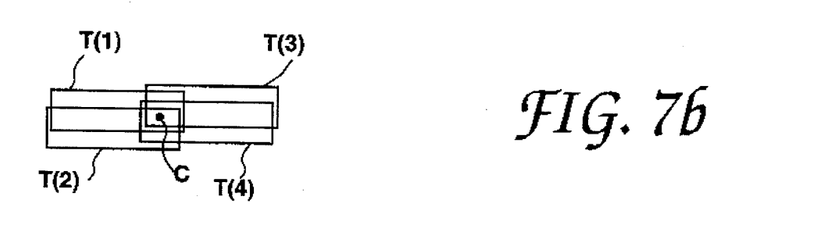

FIGS. 7, 7a, and 7b illustrate step 70 of FIG. 4 in greater detail. The tiles T(1)–T(4) of FIG. 7a are the same as the tiles T(1)–T(4) of FIG. 6b, it being understood that the image I is not shown in FIG. 7a for the purpose of clarity but that it still exists within the perimeters of the tiles. The center of the assembled tiles T(1)–T(4) is still the centerpoint C.

In a first step 71 of FIG. 7, the variable TEMP is assigned the bit map value of tile T(t). On the first time through iterative loop step 68, TEMP is therefore assigned the bit map value of tile T(1). Next, in a step 73, TEMP is offset by an amount 1/F towards the center C of bit map area A. This is illustrated in FIG. 7b. TEMP carries with it the portion of image I which is within tile T(i). Finally, in step 75, TEMP is copied to bit map area D. After T=4 times through iterative loop step 68, the bit map area D will appear as shown in FIG. 7b, with the appropriate portions of image I appearing within the tiles.

Figure 8A:
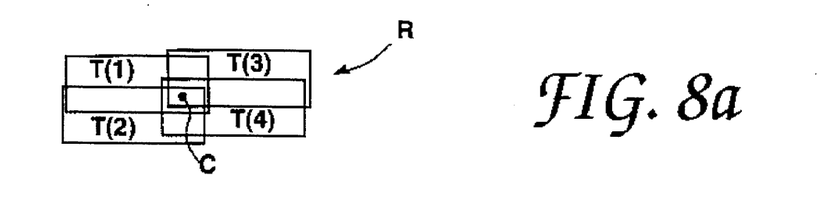
FIG. 8a illustrates the formation of a quadrangle from the converging tiles created by step 70 of FIG. 7.
Figure 8B:
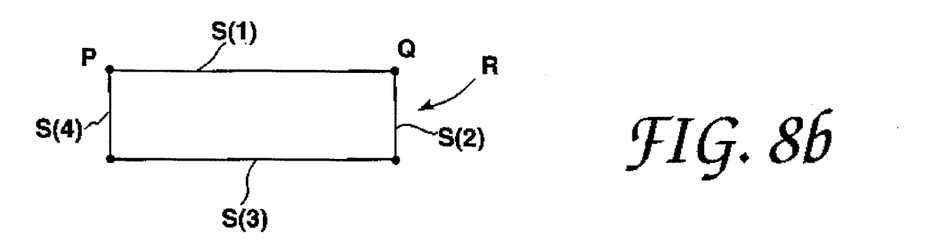
FIG. 8b illustrates the quadrangle of FIG. 8a without the tiles.

Step 72 of drawing a ragged rectangle will be discussed in greater detail with reference to FIGS. 8a, 8b, 9a, and 9b. In FIG. 8a, a quadrilateral R is drawn around the converging tiles T from the outside corners of the tiles T(1)–T(4). The quadrilateral R, without the tiles, is shown in FIG. 8b to include segments S(1), S(2), S(3), and S(4). The object of step 72 is to replace each of the segments S with a ragged line image of those segments.

Figure 9A:
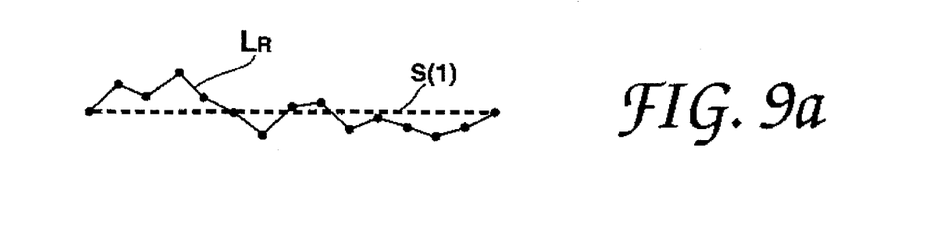
FIG. 9a illustrates a ragged line derived from one of the segments of the quadrangle of FIG. 8b.
Figure 9B:
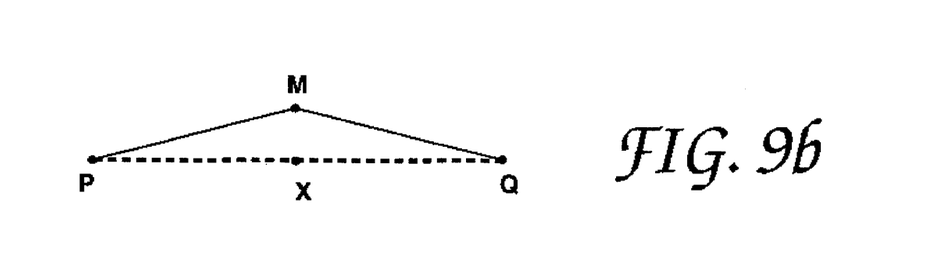

For example, in FIG. 9a, the segment S(1) of quadrilateral R is shown with a phantom line. Segment S(1) extends between endpoints P and Q. To provide a paper crumpling effect, it is desired to convert the segment S(1), as well as the other segments of quadrilateral R, into ragged lines such as line LR.

A method for converting a straight line segment (such as segment S(i)) to a ragged segment will be discussed with reference to the following pseudo-code example:

| EXAMPLE: ROUTINE RAGGED | |
|---|---|
| L1 | ROUTINE RAGGED (Px,Py,Qx,Qy) |
| L2 | l = length of (P,Q) |
| L3 | e = maximum ragged segment length |
| L4 | IF l > e |
| L5 | Mx = (Px + Qx)/2 + RANDOM |
| L6 | My = (Py + Qy)/2 + RANDOM |
| L7 | RAGGED (Px,Py,Mx,My) |
| L8 | RAGGED (Mx,My,Qx,Qy) |
| L9 | ELSE |
| L10 | DRAW (Px,Py,Qx,Qy) |
| L11 | RETURN |

Routine RAGGED is a recursive routine which converts a straight line segment such as segment S(1) of FIG. 9a to a ragged segment such as line LR. In a first line L1 the routine is called by passing the x and y coordinates of points P and Q (see FIG. 9b). The coordinates for point P are (Px,Py) and the coordinates for point Q are (Qx,Qy). In line L2, the routine calculates and assigns the length of the line between points P and Q to the variable l. The constant e is assigned the maximum ragged segment length (e.g. 0.25 inches) in line L3. If l>e in line L4, then the variables Mx and My are calculated in lines L5 and L6, and the routine RAGGED is recursively called in each of lines L7 and L8.

Referring again to FIG. 9b, since the distance between points P and Q is greater than e, a randomized midpoint M having coordinates (Mx,My) is calculated by taking the midpoint X of line PQ (calculated as ((Px+Qx)/2,(Py+Qy)/2) and adding a small random x and y factor. Random routines such as routine RANDOM are well known to those skilled in the art. In line L7, the routine RAGGED is recursively called with the coordinates of line PM, and in line L8 the routine RAGGED is recursively called with the coordinates of line MQ. This will have the effect of further "raggedizing" line segments PM and MQ. If PM and MQ are still longer than e, the recursive process of lines L5–L8 continues until a ragged line such as line LR of FIG. 9a results. Since the function RANDOM is used for the RAGGED routine, the ragged lines should differ each time the routine RAGGED is called.

If l≦e. (line L9) a line is drawn on the screen from (Px,Py) to (Qx,Qy) as seen in line L10. The routine then returns to the prior iteration of the routine or to the original routine call step in line L11.

After completion of the iterative loop step 66, i.e. after the crumpling of the paper has been fully animated, process control is returned to step 56 of FIG. 3.

Figure 10:
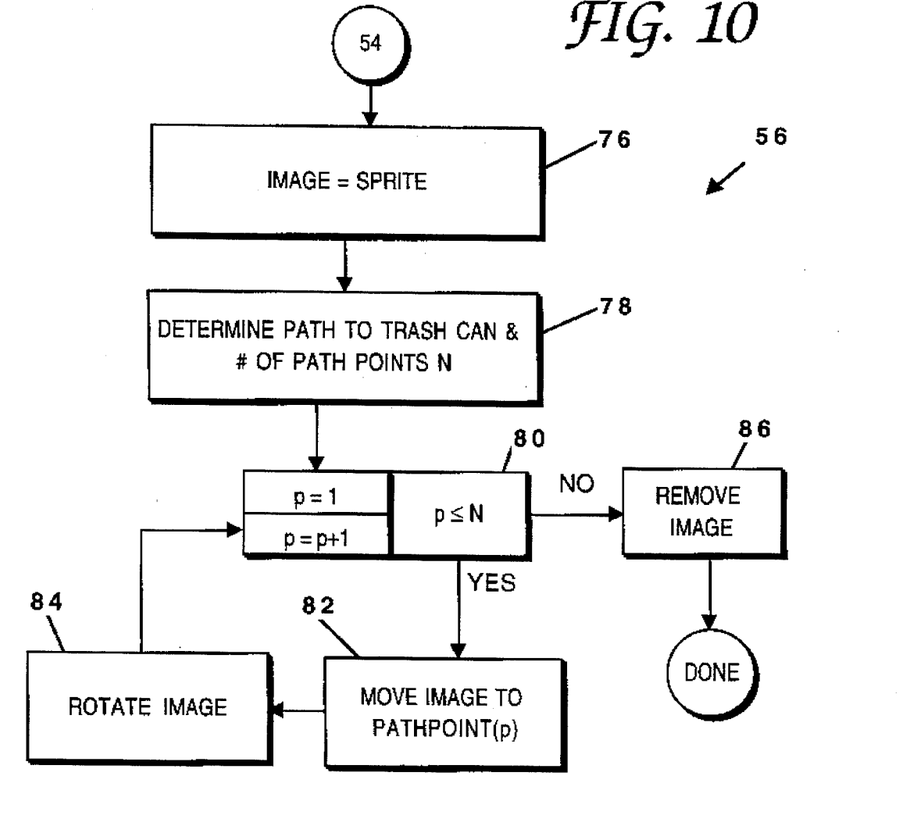
FIG. 10 is a flow diagram of step 56 of FIG. 3.
Figure 10A:
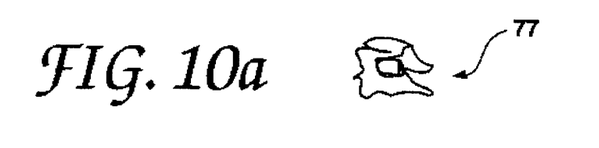
FIG. 10a illustrates a "sprite" used as a part of the animation of the process 47 of FIG. 3.

In FIG. 10, step 56 of FIG. 3 is illustrated in greater detail. In a first step 76, the bit map image D ("IMAGE") is replaced with an image known as a "sprite", which is simply an icon stored in memory which represents the final, crumpled object. An example of a sprite 77 is shown in FIG. 10a. Next, in a step 78, the path that the sprite is to take to the trash can 46 is determined. An iterative loop step 80 iterates a counter p in the range p={1::P}, where N is the total number of points in the chosen path. In step 2, the sprite IMAGE is then moved to PATHPOINT(p), which is the $p^{th}$ point on the chosen path. IMAGE can be optionally rotated in a step 84 to provide additional animation effects. A preferred method for rotating IMAGE is to have an array of slightly different sprites which are sequentially presented to the screen at some or all of the points on the path. After IMAGE has been moved to all N points on PATHPOINT, the image is removed in step 86 and the process is complete.

Processes for drawing, moving, and removing objects from a computer screen are well known to those skilled in the art. For example, steps 82, 84, and 86 can be easily implemented by graphics software such as QUICKDRAW from Apple Computer, Inc. of Cupertino, Calif. A description of the QUICKDRAW graphics software is found in the book *Inside Macintosh, Volumes I, II and III*, by C. Rose et al., Addison-Wesley Publishing Company, Inc., July 1988.

Figure 11:
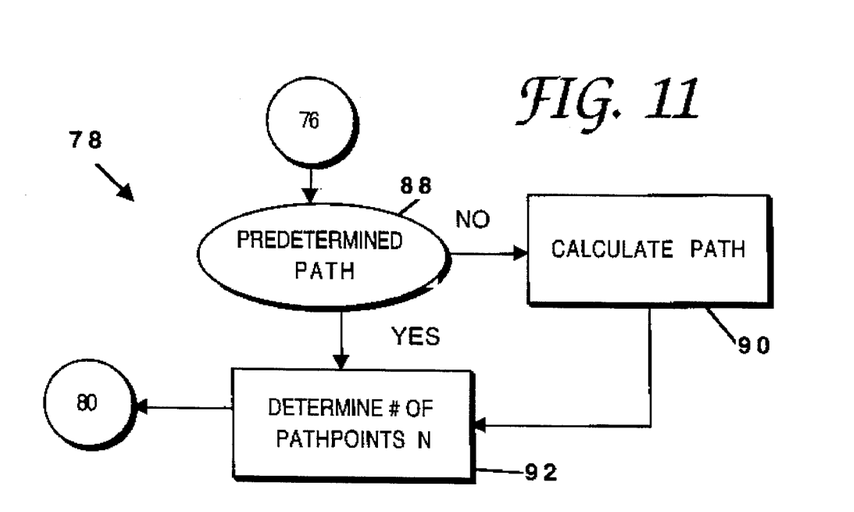
FIG. 11 is a flow diagram of step 78 of FIG. 10.

Step 78 of FIG. 10 is shown in greater detail in FIG. 11. In a first step 88, it is determined whether the path is predetermined, i.e. is there a pattern stored in the memory of system 10 which determines the path. If the path is not predetermined, it is calculated in a step 90. Finally, in step 92, the number of path points P are calculated, and an array PATHPOINT holds the x and y coordinates of the N path points in PATHPOINT(1)-PATHPOINT(N).

Figure 12A:
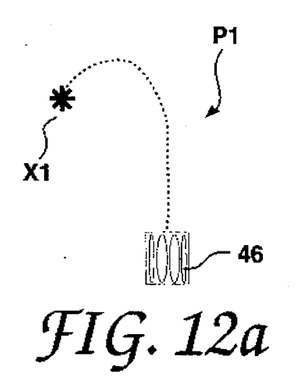
FIGS. 12a, 12b, and 12c illustrate three different paths for the object to follow on the way to the trash can 46.
Figure 12B:
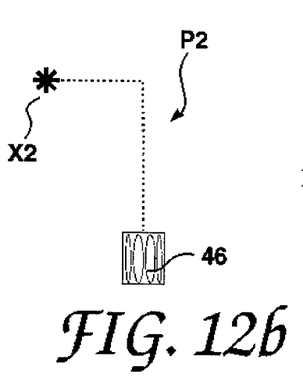
Figure 12C:
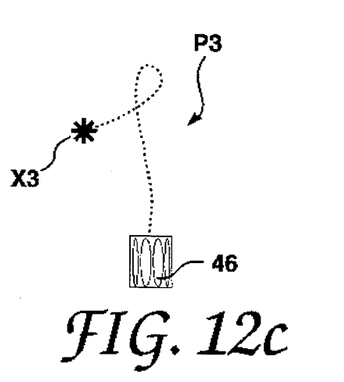

FIGS. 12a, 12b, and 12c illustrate three different paths from a starting point x to the trash can 46. In FIG. 12a, the path P1 is substantially parabolic and can be calculated in step 90 by knowing the starting point X1 and the location of the garbage can 46. In FIG. 12b, the path P2 is made of a horizontal and a vertical straight line segment and can be calculated in step 90, again by knowing the starting point X2 and the location of the garbage can. In FIG. 12c, an arbitrary path P3 extending from starting point X3 to the garbage can 46 be predetermined (i.e. stored in memory) and sized by well-known techniques to extend from point X3 to the trash can 46.

While the process of the present invention has been described in terms of animating the crumpling of an object and animating the movement of the crumpled object to a trash can, the invention is not limited to this one example. For example, an object being trashed (text, graphics, numeric, etc.) can be animated such that it appears to be folded into a paper airplane which is "flown" into the garbage can. Also, other actions than deleting or "trashing" can be taken on an object. For example, if an object is to be mailed, it can be folded in thirds and then moved along a path into an icon of an envelope. As another example, an object to be filed can be animated to slip into a file folder which moves across the screen into an open drawer of a filing cabinet.

The apparatus of the present invention is preferably based upon a pen-based computer system, although general purpose computer systems are also acceptable. The apparatus includes a computation device and a display assembly coupled to the computation device for displaying at least one object on a screen. The apparatus further includes an apparatus for determining an action to be taken on the object, an apparatus for modifying the visual appearance of the object through animation techniques, and an apparatus for automatically moving the modified object to indicate its disposition. As is well known to those skilled in the art, various apparatus of the present invention can be implemented in hardware, software, or both.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A method for visually animating a deletion of a computer object represented by a corresponding object image displayed on a display screen of a display assembly in a computer system, the method comprising the steps of:

indicating that the computer object is selected for deletion by selecting the corresponding object image displayed on the display screen of the display assembly;

animating a crumpling of the selected corresponding object image that is displayed on the display screen wherein the animated crumpling includes the substeps of:

dividing said corresponding object image of the selected computer object into a plurality of portions; and converging said portions towards a central area of said corresponding object image of the selected computer object;

replacing said portions with a sprite image representing said crumpled corresponding object image; and automatically moving said sprite image representing said crumpled corresponding object image across said display screen to a position that overlaps an icon on the display screen which indicates the deletion of said computer object.

2. A method as recited in claim 1 further comprising the step of drawing a perimeter around said converging portions comprising a plurality of straight-line segments.

3. A method as recited in claim 2 further comprising the step of randomizing said straight-line segments to form a plurality of jagged line segments.

4. A method as recited in claim 3 wherein said step of randomizing said straight-line segments comprises:

identifying a straight-line segment from a bit map area located in RAM to be converted into a ragged line segment;

recursively dividing said straight-line segment while adding a random factor to create a ragged line segment in a bit map area located in RAM; and drawing said ragged line segment on a computer screen to provide a paper crumpling effect.

5. A method as recited in claim 1 further comprising the step of animating said sprite.

6. A method as recited in claim 5 wherein said step of animating said sprite comprises rotating said sprite.

7. A pointer based computer system comprising: computer processing unit;

display assembly coupled to said computer processing unit, said display assembly including a screen displaying at least one object;

a pointer for inputting information to the computer processing unit;

means for receiving a deletion command indicating the desired deletion of a selected object displayed on the display screen of the pointer based computer system, the deletion command being initiated using the pointer, and the selected object having an initial visual appearance indicative of an initial status;

modification means for modifying the visual appearance of the image of the selected object displayed on the display screen through graphical animation to provide the user with an animated indication of the deletion of the selected object, the modification means being responsive to the deletion command without requiring any additional inputs from the user, the animated indication of the deletion including an animation that appears as a crumpling of the image of the selected object;

means for automatically moving said modified image of the selected object across the display screen to a position that overlaps an icon displayed on the screen which indicates the deletion of said object, said means for automatically moving said modified image being responsive to the deletion command without requiring any additional inputs from the user; and means for executing the deletion command on the selected object, said means for executing the deletion command being responsive to the deletion command without requiring any additional inputs from the user.

8. A computer system as recited in claim 7 wherein said means for receiving a deletion command includes:

means for selecting said object on said screen; and means for specifying said object should be deleted.

9. A computer system as recited in claim 7 wherein said pointer is a stylus and said display assembly is a dual-function display assembly of a pen-based computer system, the dual-function display assembly includes a display screen and a position sensitive membrane responsive to said stylus for receiving said change in status command.

10. A computer system as recited in claim 7 wherein said means for receiving a deletion command is implemented by the computer system without user input beyond the deletion command initiated using the pointer.

11. A method for deleting an object having an image displayed on a display screen of a pointer based computer system having a graphical user interface and providing a user with visual feedback indicative of the deletion, the method comprising the steps of:

receiving a deletion command indicating a desired deletion of a selected object having an image displayed on the display screen of the computer system, the change in status command being initiated using the pointer, and the image of the selected object having an initial visual appearance indicative of the initial status;

modifying the visual appearance of the image of the selected object displayed on the display screen through graphical animation to provide the user with an animated indication of the deletion of the selected object, the modifying being done in response to the deletion command without requiring any additional inputs from the user, the graphical animation including an animation that appears as a crumpling of the image of the selected object;

automatically moving said modified image of the selected object across the display to a position that overlaps an icon on the screen which indicates the deletion of the selected object, said moving being done in response to the deletion command without requiring any additional inputs from the user; and automatically executing the deletion command on the selected object without any additional input from the user.

12. A method as recited in claim 11 wherein said icon represents the deletion of said object.

13. A method as recited in claim 11 wherein said icon represents the storage of said object.

14. A method as recited in claim 11 wherein said modified object is moved along an arcuate path to said icon.

15. A method as recited in claim 14 wherein said arcuate path is substantially hyperbolic.

16. A method as recited in claim 15 wherein said arcuate path includes a loop.

17. A method as recited in claim 11 wherein said modified object is moved along a path including at least one substantially straight segment to said icon.

18. A method as recited in claim 11 further comprising the step of animating said object as it moves along said path.

19. A method as recited in claim 18 wherein said step of animating said object comprises rotating said object.

20. A method as recited in claim 18 wherein said step of animating said object comprises wobbling said object.

21. A method as recited in claim 11 further comprising the step of providing an audible user feedback as said object is modified in visual appearance.

22. A method as recited in claim 11 further comprising the step of providing audible user feedback as said modified object is automatically moved.

23. A method as recited in claim 11 wherein the icon which indicates the deletion of the object is a trash icon.

24. A method as recited in claim 23 wherein the computer system is a pen based computer system having a stylus and a dual-function display assembly, the dual-function display assembly including the screen and a position sensitive membrane that covers said screen, and wherein the stylus is used to input information to the computer by contacting the display screen and the change of status command is entered by the stylus.

25. A method as recited in claim 11 wherein said animation that appears as a crumpling of the image includes a method for drawing a ragged line segment on a computer screen comprising:

identifying a straight-line segment from a bit map area located in RAM to be converted into a ragged line segment;

recursively dividing said straight-line segment while adding a random factor to create a ragged line segment in a bit map area located in RAM; and drawing said ragged line segment on a computer screen to provide a paper crumpling effect.

\* \* \* \* \*